United States Patent
Enström

(10) Patent No.: US 7,631,739 B2
(45) Date of Patent: Dec. 15, 2009

(54) DUAL WET CLUTCH WITH AN ELECTRIC MACHINE

(75) Inventor: Hans Enström, Lerum (SE)

(73) Assignee: Getrag Ford Transmissions GmbH, Scarletallee (DE)

( * ) Notice: Subject to any disclaimer, the term of this patent is extended or adjusted under 35 U.S.C. 154(b) by 418 days.

(21) Appl. No.: 11/539,844

(22) Filed: Oct. 9, 2006

(65) Prior Publication Data
US 2007/0089962 A1    Apr. 26, 2007

(30) Foreign Application Priority Data
Oct. 20, 2005    (EP) .................................. 05109805

(51) Int. Cl.
*F16D 25/00*    (2006.01)

(52) U.S. Cl. ................ 192/87.15; 192/48.8; 192/70.12; 192/113.34

(58) Field of Classification Search ................ 192/48.8, 192/87.11, 87.14, 87.15, 87.17, 70.12, 113.3, 192/113.34; 310/78
See application file for complete search history.

(56) References Cited

U.S. PATENT DOCUMENTS

| | | | |
|---|---|---|---|
| 6,929,107 B2 * | 8/2005 | Hegerath | 192/87.11 |
| 7,246,692 B2 * | 7/2007 | Braford | 192/87.11 |
| 7,293,637 B2 * | 11/2007 | Janson et al. | 192/87.11 |
| 7,478,718 B2 * | 1/2009 | De Maziere | 192/87.15 |
| 2005/0087420 A1 * | 4/2005 | Schafer et al. | 192/55.61 |
| 2005/0189195 A1 * | 9/2005 | Heinrich et al. | 192/87.11 |

FOREIGN PATENT DOCUMENTS

| | | |
|---|---|---|
| DE | 100 49 955 | 4/2002 |
| EP | 1 195 537 | 4/2002 |
| FR | 2 814 516 | 3/2002 |

* cited by examiner

*Primary Examiner*—David D. Le
(74) *Attorney, Agent, or Firm*—Schlee IP International, P.C.; Alexander R. Schlee

(57) ABSTRACT

A dual clutch for a transmission with a first transmission input shaft and a second transmission input shaft that is positioned in coaxial relation to the first transmission input shaft. The dual clutch comprises a clutch portion comprising a hollow cylinder portion for transmitting torque, wherein the hollow cylinder portion is provided in a radial position between a clutch axle and a clutch hub, is rotatable in relation to the clutch axle and the clutch hub, and comprises at least one opening allowing oil to be fed from the clutch axle to the clutch hub. This design allows supply of hydraulic oil, sufficient cooling oil, and at the same time flexibility in attaching auxiliary engines such as an electromotor to the dual clutch.

15 Claims, 2 Drawing Sheets

US 7,631,739 B2

DUAL WET CLUTCH WITH AN ELECTRIC MACHINE

CROSS-REFERENCE TO RELATED APPLICATIONS

This application claims the priority of European Patent Application EP05109805 having a filing date of Oct. 20, 2005, the entire content of which is herewith incorporated by reference.

BACKGROUND OF THE INVENTION

The invention relates to a dual clutch for a transmission with a first transmission input shaft and a second transmission input shaft that is positioned in coaxial relation to the first transmission input shaft.

Such a dual clutch is for instance known from the European patent EP 1 195 537 B1. The dual clutch comprises the coupling flange that can be connected to an engine or motor in a torque transmitting manner. Further, this dual clutch comprises a first clutch and second clutch. Both clutches can be actuated hydraulically. In case of the first clutch, assuming for instance, the closed position torque can be transmitted from the coupling flange to the first transmission input shaft. Accordingly, the second clutch is provided for transmitting torque from the coupling flange to the second transmission input shaft.

Each one of the two clutches comprises several outer clutch discs and several inner clutch discs. Via the clutch comprising an inner clutch discs carrier and via a rotatable clutch housing with a clutch cover the respective inner clutch discs of the first and second clutches are connected in a torque transmitting manner with the coupling flange, respectively. The outer clutch discs of the first clutch are connected to the first transmission input shaft in a torque transmitting manner via the first clutch cap, while the outer clutch discs of the second clutch are connected to the second transmission input shaft in a torque transmitting manner via the second clutch cap.

The clutch hub comprises, apart from the inner clutch discs, also a first hydraulic unit for actuating the first clutch and a second hydraulic unit for actuating the second clutch. The first hydraulic unit can exert pressure in axial direction against the intermittently and adjacent to each other positioned inner clutch discs and outer clutch discs, thereby pressing the inner clutch discs and the outer clutch discs in axial direction against each other. Due to the friction between the clutch discs the first clutch can transmit a torque generated by friction. In an identical manner the second hydraulic unit can actuate the second clutch for transmitting, in its closed position, torque from the clutch hub to the second transmission input shaft.

The clutch hub is supported in a rotatable manner on a clutch axle that is positioned in the coaxial relation to the first transmission input shaft and the second transmission input shaft. The clutch axle not only provides support in a rotatable manner for the clutch hub but also feeds the clutch hub with oil. The first and second hydraulic units require pressurized hydraulic oil for pressing the clutch disc stack together. In addition, by means of the clutch axle, the first and second clutches are fed with cooling oil for conducting off heat resulting from an operational slipping mode of the first and second clutches.

The rotatable clutch housing, together with the clutch cover, forms the closed clutch cup accommodating the first and second clutch as well as the respective clutch caps. Due to the almost entire enclosure by means of the coupling housing that is rotating together with the coupling flange and the motor, no connection between an auxiliary motor provided at the outer circumference of the clutch housing and the first and second clutch caps can be established. To the contrary, it is only possible to connect the auxiliary motor positioned radially outside with the rotatable clutch housing. The connection to the output side of the first or second clutch, that is with the first or second clutch caps, is almost impossible to establish.

It may be possible to connect a rotor of, an electromotor in a torque transmitting manner to the first or outer clutch cap, wherein the rotor is provided within the clutch housing. This means that the stator and rotor would be separated by the wall of the clutch housing from each other. When choosing the right material for the clutch housing and an appropriate radial distance between the rotor and the stator, the desired torque of the electromotor could be transmitted to the first clutch cap and therefore to the first transmission input shaft. However, this results in a relatively complex design of the electromotor.

SUMMARY OF THE INVENTION

One object of the invention is to provide a dual clutch in which the connection of the clutch flange in a torque transmitting manner to the first or second clutch, and of the first and second clutch to the first or second transmission input shaft, allows more design flexibility. In particular, the design should allow an easy connection of an electromotor to this dual clutch.

These and other objects are achieved by the features in claim 1. Advantageous further embodiments of the dual clutch according to the invention are described in the dependent claims.

In a preferred embodiment of the dual clutch according to the present invention, a clutch portion is provided with a hollow cylinder shaped portion for transmitting torque, said hollow cylinder shaped portion being positioned when viewed in axial direction between the clutch axle and clutch hub in a rotatable manner and comprises at least one opening through which oil is fed from the clutch axle to the clutch hub. The clutch portion can be provided for establishing a torque transmitting connection of the clutch flange with the input side of the first and second clutches or for providing a torque transmitting connection of the output side of the first clutch with the first transmission input shaft.

Due to the clutch portion, the clutch hub is not directly supported on the fixed clutch axle. Between the clutch portion and the clutch hub, the hollow cylinder shaped portion is provided that can rotate with the different rotational speed than the clutch axle and clutch hub. By providing appropriate bearing between the clutch hub and the clutch portion as well as between the clutch portion and the hub axle further a good radial support is guaranteed for supporting the clutch hub that usually forms a big rotating mass.

At least one opening provides that the first and second hydraulic units are provided with oil via the clutch axle. The oil is fed by means of a hydraulic pressure system into the clutch axle, and from there through the openings of the hollow cylinder shaped portion of the clutch portion to the clutch hub feeding the oil through appropriate channels to the first and/or second hydraulic units.

According to a preferred embodiment, an electromotor is provided enclosing in radial direction the first and second clutches and comprising a ring-shaped stator and a ring-shaped rotor. The rotor can be connected to the clutch portion in a torque transmitting manner. The torque from the electromotor can be transmitted to the clutch portion regardless of the open or closed operational modes of the first clutch. In the case of the clutch portion serving for transmitting of torque when the first clutch assumes its open operational mode to the first transmission input side, in consequence the torque provided by the electromotor can be transmitted to the first transmission input shaft independently from the motor connected to the coupling flange. This would, for example, allow synchronizing the rotational speed of the first transmission input shaft with the rotational speed of the motor allowing the use of a claw coupling or any other positive coupling as the first clutch. In lieu of the electromotor, the clutch portion can also be connected to a different auxiliary engine allowing torque to be transmitted from the auxiliary engine via the clutch portion to the first transmission input shaft. The position of the auxiliary engine is in this case not restricted to the radially outer position as described in connection with the electromotor above. Moreover, an auxiliary engine (electromotor) can be connected with the second transmission input shaft in a torque transmitting manner. Due to space restrictions a second auxiliary engine can also be positioned remotely from the dual clutch.

In a preferred embodiment, the clutch portion comprises the plate-shaped portion connecting the rotor of the electromotor with the hollow cylinder shaped portion. The plate-shaped portion bridges the radial distance between the rotor and the hollow cylinder shaped portion. Preferably, the plate-shaped portion is provided at that side of the dual clutch that is remote from the motor.

According to a preferred embodiment the clutch hub and the clutch flange are connected in a torque transmitting manner with each other, wherein the clutch hub carries the clutch discs at the input side of the first and second clutches in a torque transmitting manner. Therefore, the clutch discs at the input side (side of the motor) of the first and second clutches rotate with the same rotational speed as of the motor when the dual clutch is installed. At the output side (side of the transmission) the clutch discs of the first clutch can be connected in a torque transmitting manner to the clutch portion.

The clutch discs of the second clutch can be connected to the second transmission input shaft via a clutch cap. The clutch cap comprises a clutch base provided at the side of the dual clutch facing of the motor.

At that end of the hollow cylinder shaped portion facing the motor a ring can be connected providing a torque transmitting connection between the clutch portion and the first transmission input shaft. The ring encloses the fixed clutch axle at its end facing the motor, said clutch axle being provided between the hollow cylinder shaped portion and the first transmission input shaft.

The hollow cylinder portion can be supported in a rotatable manner on the clutch hub by means of at least one rolling bearing provided at the outside of the hollow cylinder shaped portion. Preferably, cylinder roller bearings are provided at an axial distance from each other and transmit forces acting on the clutch hub to the hollow cylinder shaped portion.

By means of the rolling bearings provided at the inside of the hollow cylinder shaped portion, said portion can be supported in a rotatable manner on the fixed clutch axle. Also in this case cylinder roller bearings provided in an axial distance to each other can be used.

The hollow cylinder shaped portion can be provided with a first group of openings allowing oil to be fed from the clutch axle via at least one channel within the clutch hub to the first hydraulic unit. Hydraulically separated therefrom, the hollow cylinder shaped portion may be provided with a second group of openings allowing oil to be fed from the clutch axle for the purpose of cooling to the first and/or second clutches. The first and second clutches can be provided with separate cooling oil flows that are independent from each other. In addition, the hollow cylinder shaped portion can be provided with a third group of openings allowing oil to be fed from the clutch axle through at least one additional channel to the second hydraulic unit. As a result, the hollow cylinder shaped portion of the clutch portion feeds in a hydraulically separated manner oil with different oil pressures from the clutch axle to the clutch hub.

At least one opening can be provided as a bore within the hollow cylinder shaped portion, wherein the bore is preferably connected to a ring-shaped groove of the clutch axle at the inside of the hollow cylinder shaped portion and with a ring-shaped groove of the clutch hub at the outside of the cylinder shaped portion. Regardless of the relative rotation between the clutch axle and the hollow cylinder shaped portion on the one hand and the hollow cylinder shaped portion and the clutch hub on the other hand oil can be fed from the fixed clutch axle to the rotating clutch hub.

DETAILED DESCRIPTION OF THE DRAWINGS

Figure 1:
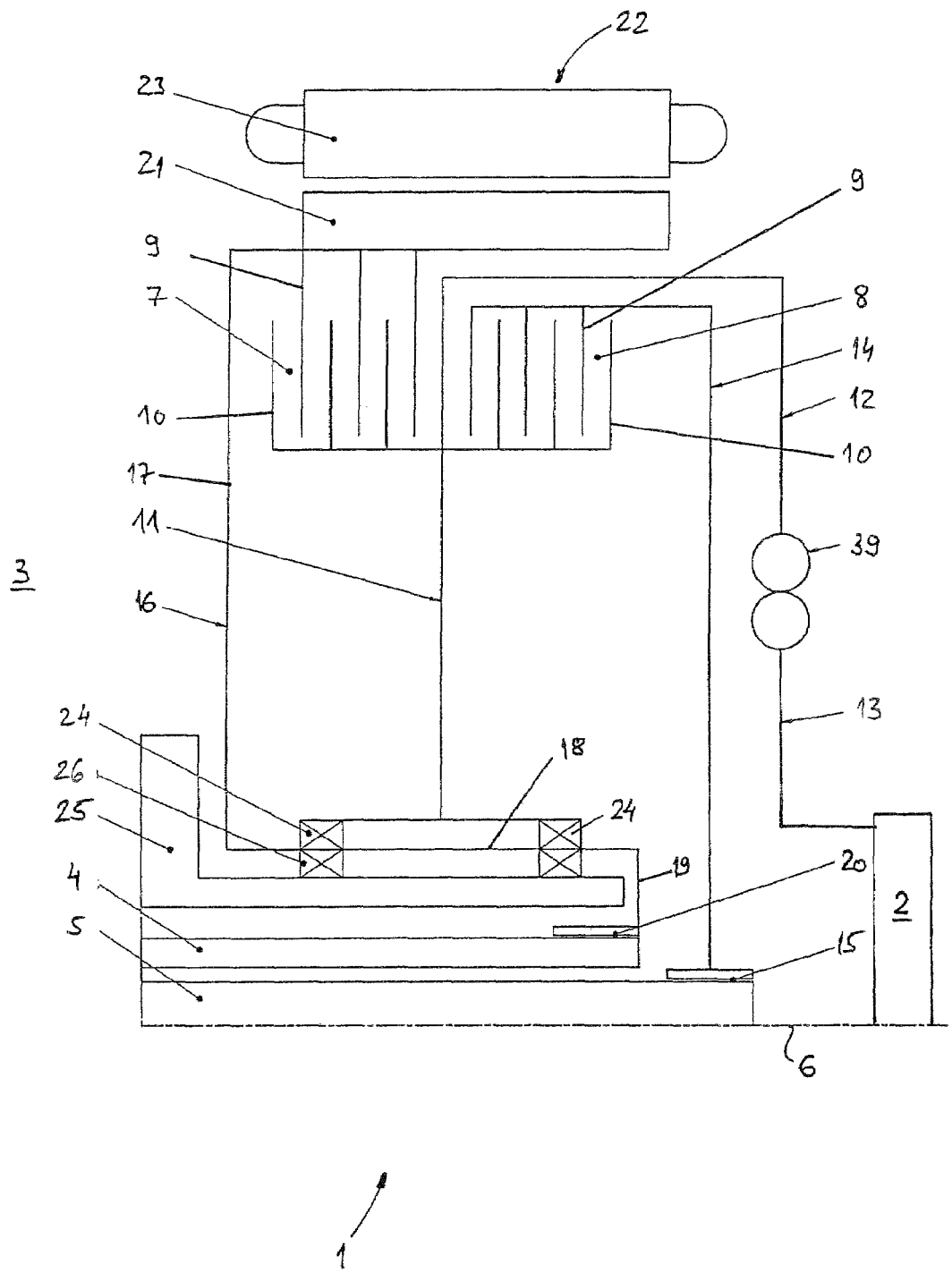
FIG. 1 shows a schematic view of a preferred embodiment of a dual clutch according to the invention.

FIG. 1 shows a schematic view of a dual clutch that is denoted 1 in its entirety. The dual clutch 1 is installed between an only schematically shown motor 1 and a just symbolized transmission 3. Of the transmission 3 only a first transmission input shaft 4 and a second transmission input shaft 5 are shown. The first and the second transmission input shafts 4, 5 are positioned in coaxial relation to each other, the first input shaft of which is formed as a hollow shaft. The first and second input shafts 4, 5 are able to rotate around a common axis 6.

The dual clutch 1 comprises the first clutch 7 and a second clutch 8. Clutches 7 and 8 each comprise the plurality of outer clutch discs 9 and inner clutch discs 10. In the closed position, for instance of the first clutch 7, a frictional connection between the outer clutch discs 9 and the inner clutch discs 10 is provided allowing torque to be transmitted between the clutch discs 9, 10. In analogy, this applies also to the second clutch 8. The inner clutch discs 10 of the first and second clutches are connected in a torque transmitting manner by means of the clutch hub 11 and the clutch cup 12 with the motor 2. Between the coupling flange 13 allowing the motor to be connected in a torque transmitting manner and the clutch cup 12, a torsion oscillating damper 38 is provided for isolating the respective parts of the dual clutch 1 from oscillations generated by the motor 2 that is designed as a combustion engine. The outer clutch discs 9 of the second clutch 8 are connected to the second transmission input shaft by means of the clutch cap 14 in a torque transmitting manner. The rotation of the clutch cap 14 is thereby transmitted by means of the teeth profile 15 to the second transmission input shaft 5.

The outer clutch discs 9 of the first clutch 7 are connected in a torque transmitting manner with a clutch portion that is denoted with a reference sign 16. The clutch portion 16 comprises a plate-shaped portion 17 and a hollow cylinder shaped portion 18. When the first clutch 7 assumes its closed position, torque is transmitted from the motor 2 to the outer clutch discs 9 of the first clutch 7, from where the torque is transmitted by means of the plate-shaped portion 17 via the hollow cylinder shaped portion 18 to the first transmission input shaft 4. For transmitting of the torque from the hollow cylinder shaped portion 18 to the first transmission input shaft 4 a ring 19 is provided that is connected in a torque transmitting manner with the hollow cylinder shaped portion 18 as well as via the teeth/spline profile 20 with the first transmission input shaft 4.

The clutch portion 16 carries in a torque transmitting manner a rotor 21 of an electromotor 22. Apart from the rotor 21 the electromotor 22 comprises a stator 23. The rotor 21 and the stator 23 are ring-shaped and enclose in a radial direction both clutches 7, 8 and also the clutch hub 11. The torque generated by the electromotor 22 is transmitted via the clutch portion 16 to the first transmission input shaft 4.

The clutch of hub 11 is supported in radial direction on the hollow cylinder shaped portion 18 of the clutch portion 16. Bearings 24 are provided between the clutch hub 11 and the hollow cylinder shaped portion 18, allowing the clutch hub 11 and the coupling portion 16 to rotate with different rotational speeds around the axis 6. The clutch portion 16 with its hollow cylinder shaped portion 18 is supported on a fixed clutch axle 25. Bearings 26 provide that the forces to which the coupling portion 16 is subjected are transmitted onto the clutch axle 25 while the bearings 26 allow a rotation of the coupling portion 16 around the axis 6.

Figure 2:
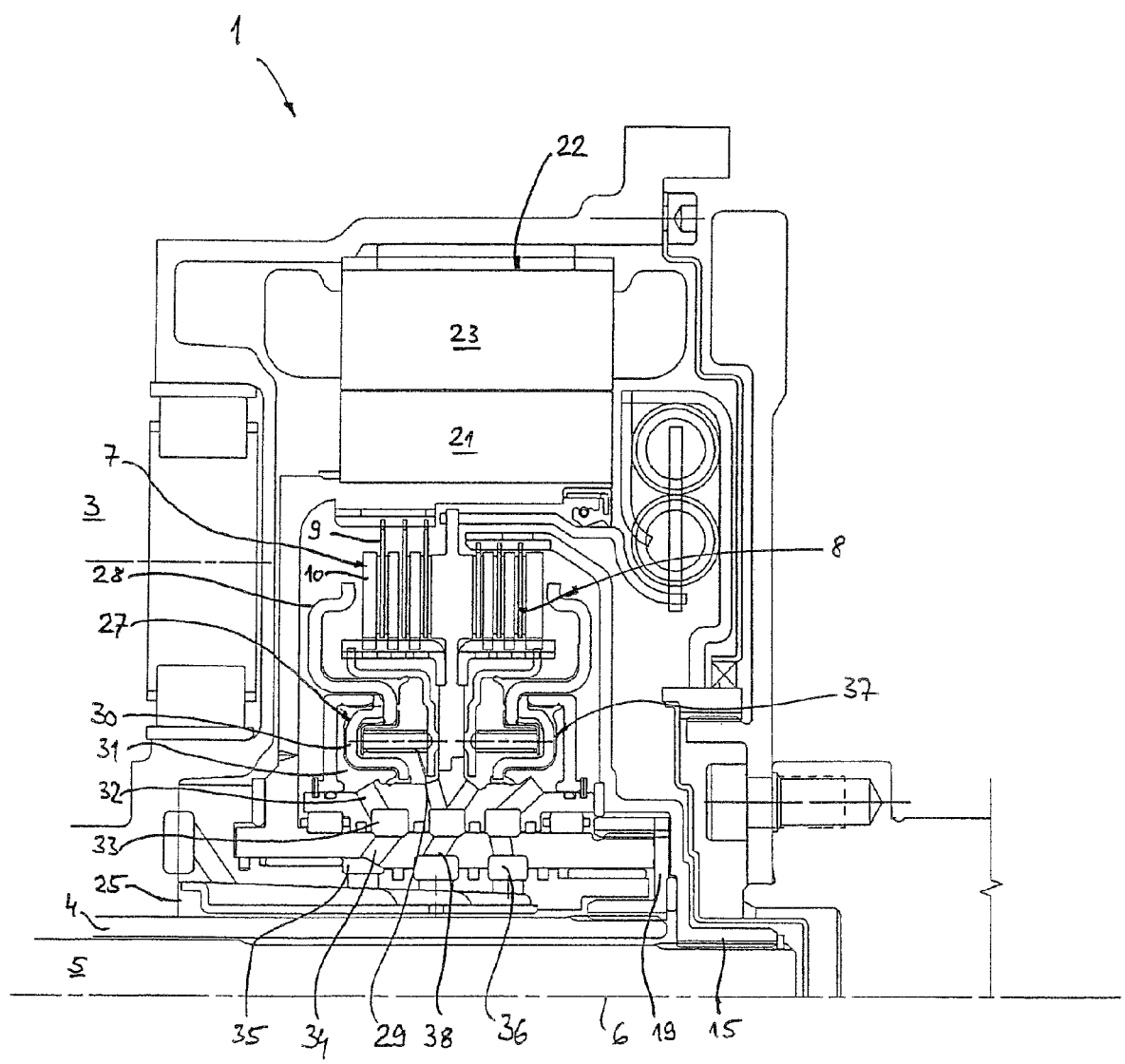
FIG. 2 shows a longitudinal section of a preferred embodiment of a dual clutch according to the invention.

FIG. 2 demonstrates an embodiment of the dual clutch 1 in more detail than the schematic view of FIG. 1. The parts correlating to the parts that are shown in FIG. 1 are denoted with the same reference signs. In particular, it becomes apparent from FIG. 2 that the fixed clutch axis 25 provides, apart from the bearing of the clutch of hub 11 and the clutch portion 16, also the object to provide the dual clutch 1 with hydraulic oil and cooling oil.

The first hydraulic unit 27 is provided for interacting with the first clutch 7, pressing the outer clutch discs 9 and the inner clutch discs 10 by means of a pressing ring 28 against each other. The hydraulic unit 27 comprises a movable piston 30 that is movable against the force of the spring 29. For pressing the outer clutch discs 9 and the inner clutch discs 10 against each other and therefore closing of the first clutch 7, oil is pressurized into the actuating chamber 31. Oil is fed through the channel 32 into the actuating chamber 31. The channel 32 connects the chamber 31 with the ring-shaped groove 33 in the clutch hub 11. An oblique bore within the hollow cylinder shaped portion 18 of the clutch portion 16 provides a hydraulic connection between the ring-shaped groove 33 and the ring-shaped groove 35 that is, at least in part, formed by means of a respective ring-shaped recess within the clutch axle 25. By means of the interconnection of the various ring-shaped grooves, channels and bores the activating chamber 31 rotating around the axis 6 can be provided with pressurized hydraulic oil from the fixed clutch axle 25, even though between the activating chamber 31 and the clutch hub 11 of the fixed clutch axle 25 the hollow cylinder shaped portion 18 is provided that rotates with a different rotational speed around axis 6 as the clutch hub 11.

In a similar manner to the ring-shaped grooves and channels, the dual clutch 1 comprises also a hydraulic connection 36 for providing a second hydraulic unit 37 with oil. The second hydraulic unit 37 is provided for actuating the second clutch 8 in an analogous manner as the first hydraulic unit 27 actuates the first clutch 7.

Moreover, the clutch 1 comprises a hydraulic connection 38 between the clutch axle 25 and the clutch hub 11 for providing the first clutch 7 and the second clutch 8 with cooling oil. The hydraulic connections 36, 38 and the connection described in detail above between the clutch axle 25 and actuating chamber 31 are hydraulically separated from each other, respectively. Therefore, also the cooling oil flow can be controlled separately for clutches 7, 8.

REFERENCE SIGNS 1 dual clutch
2 motor
3 transmission
4 first transmission input shaft
5 second transmission input shaft
6 axis
7 first clutch
8 second clutch
9 outer clutch disc
10 inner clutch disc
11 clutch hub
12 clutch cup
13 coupling flange
14 clutch cap
15 teeth/spline profile
16 clutch portion
17 plate-shaped portion
18 hollow cylinder shaped portion
19 ring
20 teeth/spline profile
21 rotor
22 electromotor
23 stator
24 bearing
25 clutch axle
26 bearing
27 first hydraulic unit
28 pressing ring
29 spring
30 piston
31 actuating chamber
32 channel
33 ring-shaped groove
34 bore
35 ring-shaped groove
36 hydraulic connection
37 second hydraulic unit
38 hydraulic connection
39 torsional oscillation damper

The invention claimed is:

1. A dual clutch for a transmission with a first transmission input shaft and a second transmission input shaft that is positioned in coaxial relation to the first transmission input shaft, the dual clutch comprising:
   a coupling flange connected in a torque transmitting manner with a motor;
   a first clutch connecting the coupling flange with the first transmission input shaft in a torque transmitting manner;
   a second clutch connecting the coupling flange with the second transmission input shaft in a torque transmitting manner;
   a clutch hub positioned in coaxial relation to the first and second transmission input shafts, the clutch hub comprising:
      a first hydraulic unit for actuating the first clutch, and
      a second hydraulic unit for actuating the second clutch;
   a clutch axle supporting the clutch hub in a rotatable manner and being hydraulically connected with the clutch hub for feeding oil from the clutch axle to the clutch hub;

a clutch portion comprising a hollow cylinder portion for transmitting torque, wherein said hollow cylinder portion is
provided in a radial position between the clutch axle and the clutch hub,
rotatable in relation to the clutch axle and the clutch hub, and
comprises at least one opening allowing oil to be fed from the clutch axle to the clutch hub.

2. The dual clutch of claim 1 wherein at an end of the hollow cylinder portion that is adjacent to the motor a ring is connected providing a torque transmitting connection between the clutch portion and the first transmission input shaft.

3. The dual clutch transmission of claim 1 wherein the hollow cylinder shaped portion is supported in a rotatable manner on the clutch hub by means of at least a rolling bearing or sleeve bearing provided at an outside part of the hollow cylinder shaped portion.

4. The dual clutch transmission of claim 1 wherein the hollow cylinder shaped portion is supported in a rotatable manner on the clutch axle by means of at least a rolling bearing or sleeve bearing provided at an inside part of the hollow cylinder shaped portion.

5. The dual clutch of claim 1 wherein at least one opening is provided as a bore within the hollow cylinder shaped portion, said bore being connected at the inside of the hollow cylinder shaped portion with a ring-shaped groove of the clutch axle and at the outside of the hollow cylinder shaped portion with a ring-shaped groove of the clutch hub.

6. The dual clutch of claim 1 wherein an electromotor is provided that does in a radial direction at least in part enclose the first and second clutches and comprises a ring-shaped stator and a ring-shaped rotor.

7. The dual clutch of claim 6 wherein the rotor is connected in a torque transmitting manner with the clutch portion.

8. The dual clutch of claim 7 wherein the clutch portion comprises a plate-shaped portion connecting the rotor with the hollow cylinder shaped portion.

9. The dual clutch of claim 1 wherein the clutch hub and the coupling flange are connected in a torque transmitting manner with each other, wherein the clutch hub carries input friction discs of the first and second clutches.

10. The dual clutch of claim 9 wherein output friction discs of the first clutch are connected in a torque transmitting manner with the clutch portion.

11. The dual clutch of claim 9 wherein output friction discs of the second clutch are connected to the second transmission input shaft by means of a clutch cap.

12. The dual clutch of claim 1 wherein the cylinder shaped portion comprises a first group of openings allowing oil to be fed from the clutch axle through a channel to the first hydraulic unit.

13. The dual clutch of claim 12 wherein the hollow cylinder shaped portion comprises a second group of openings allowing oil to be fed from the clutch axle for cooling of the first clutch.

14. The dual clutch of claim 12 wherein the hollow cylinder shaped portion comprises a second group of openings allowing oil to be fed from the clutch axle for cooling of the second clutch.

15. The dual clutch of claim 12 wherein the hollow cylinder shaped portion comprises a third group of openings allowing oil to be fed from the clutch axle to the second hydraulic unit.

* * * * *